Figure 1:
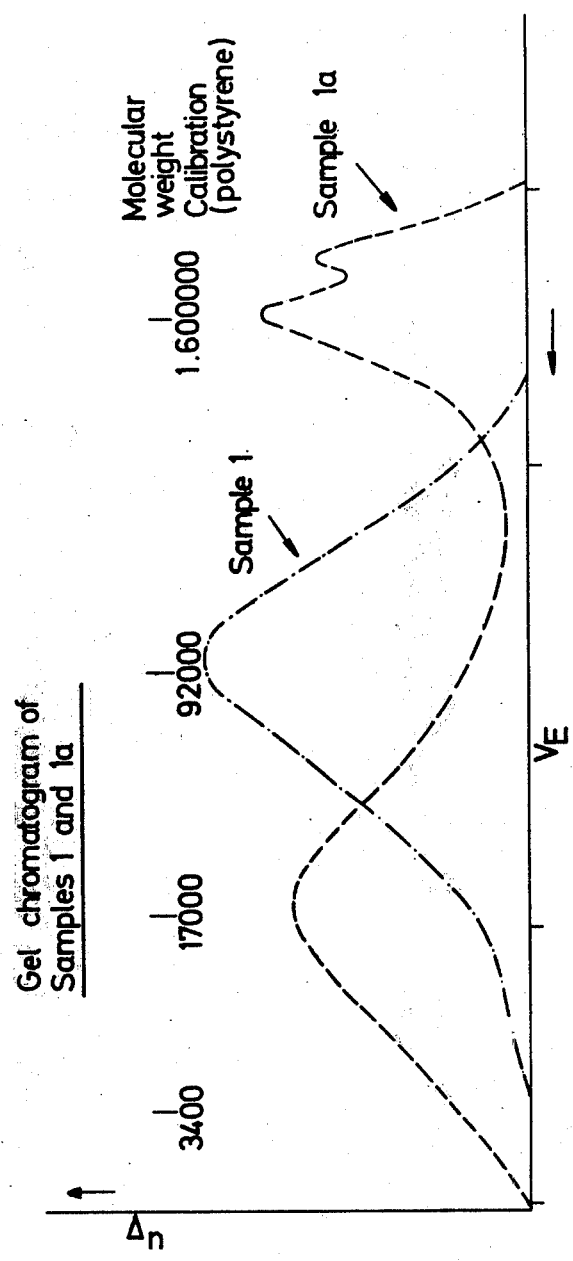

United States Patent [19]
Kraft et al.

[11] 3,969,290
[45] July 13, 1976

[54] N,N'-SUBSTITUTED 2,4,5-TRIKETOIMIDAZOLIDINES

[75] Inventors: Kurt Kraft, Auringen; Johannes Reese, Wiesbaden-Biebrich; Gerd Walz, Mainz, all of Germany

[73] Assignee: Hoechst Aktiengesellschaft, Frankfurt, Germany

[22] Filed: Jan. 23, 1974

[21] Appl. No.: 435,885

[30] Foreign Application Priority Data
Jan. 24, 1973 Germany.............................. 2303239

[52] U.S. Cl. ......................... 260/2.5 N; 260/2.5 R; 260/77.5 CH; 260/309.5
[51] Int. Cl.² ................. C08G 18/14; C08G 18/06; C08G 18/10
[58] Field of Search ................. 260/309.5, 77.5 CH, 260/2.5 R, 2.5 N, 2.5 BD

[56] References Cited
UNITED STATES PATENTS
3,609,113  9/1971  Schade et al. ................... 260/309.5

Primary Examiner—M. J. Welsh
Attorney, Agent, or Firm—Littlepage, Quaintance, Murphy & Dobyns

[57] ABSTRACT

A process for the preparation of modified N,N'-substituted-2,4,5-triketoimidazolidines which comprises reacting a precondensate having terminal isocyanate groups, prepared by reacting (a) a polybasic carboxylic acid, containing from 4 to 70 carbon atoms and from 2 to 6 carboxyl groups, with an excess of (b) one or more isocyanates or isocyanate forming compounds in the presence of a solvent, with (c) at least one oxamidic ester containing the group NH—CO—CO—OR" wherein $R^r$ represents an aliphatic hydrocarbon group containing up to 18 carbon atoms, a cycloaliphatic hydrocarbon group containing up to 8 carbon atoms or a mononuclear aromatic hydrocarbon group being unsubstituted or substituted by at least one hydrocarbon group and having a total of up to 14 carbon atoms in the presence of a solvent, a product prepared by said process and a shaped article comprising such a product.

19 Claims, 1 Drawing Figure

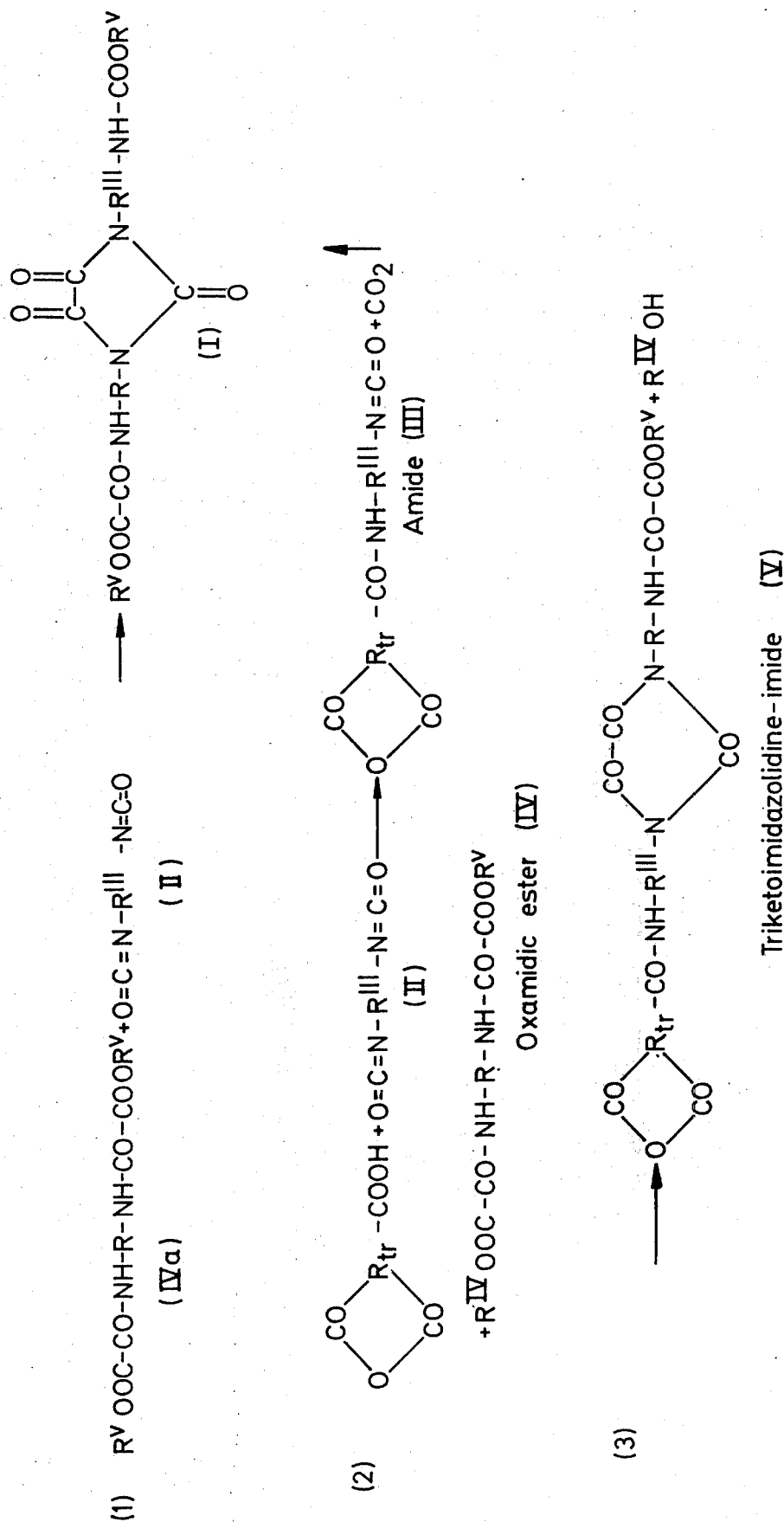

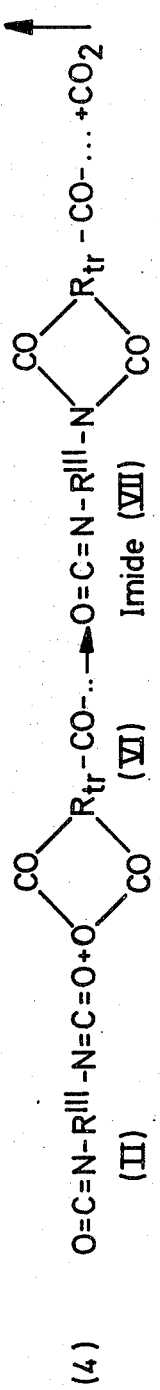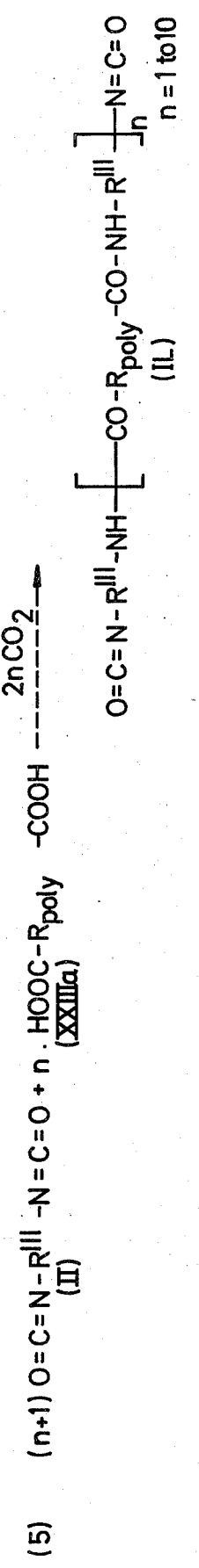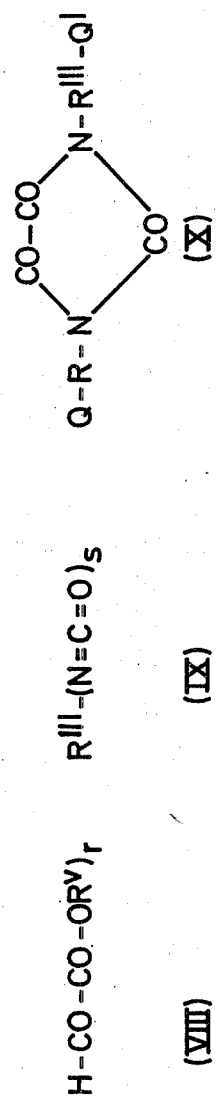

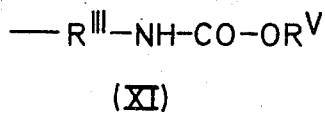
(XI)
(XII)
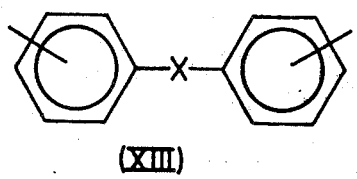
(XIII)
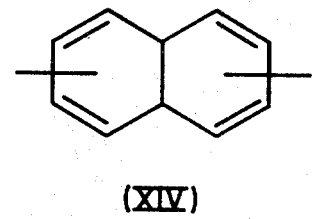
(XIV)
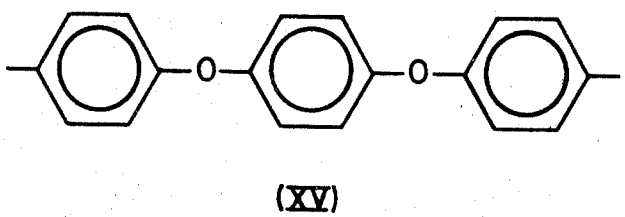
(XV)
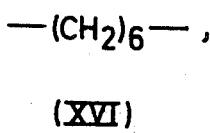
(XVI)
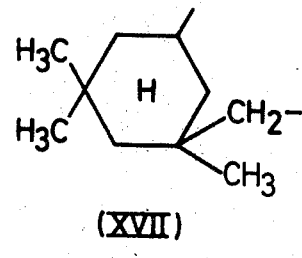
(XVII)
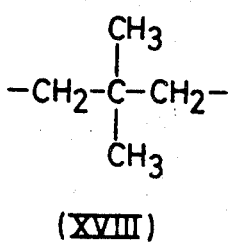
(XVIII)
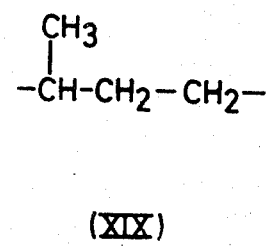
(XIX)

(XX) 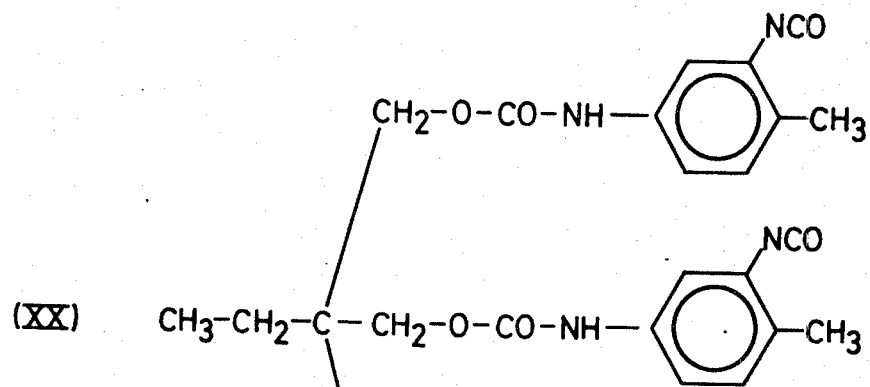
(XXI) 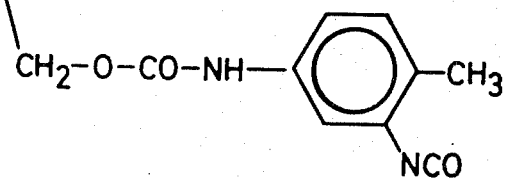
(XXII) 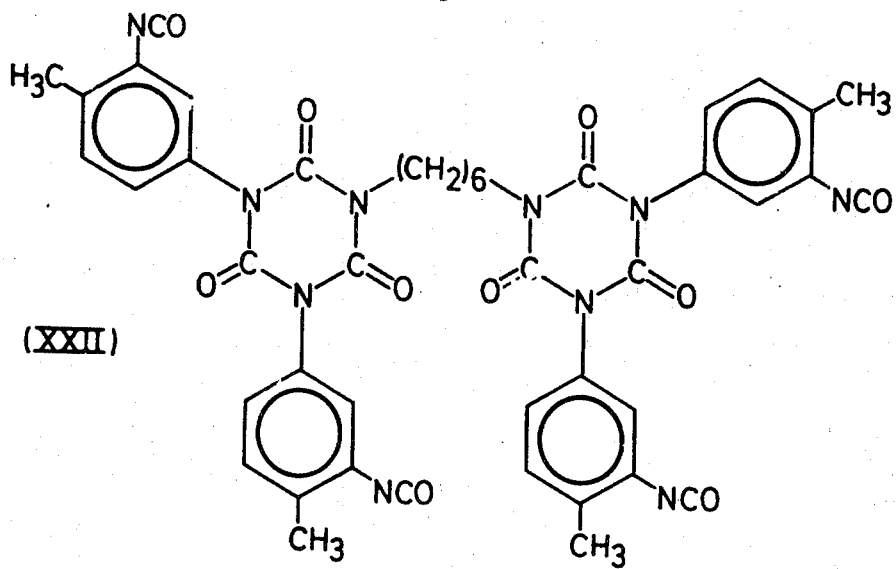

$R_{poly}(COOH)_p$ (XXIII)
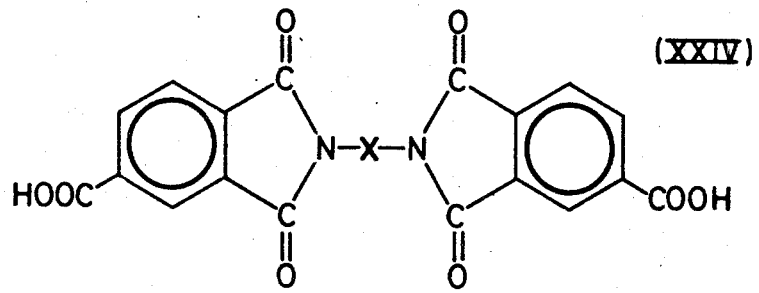
(XXIV)
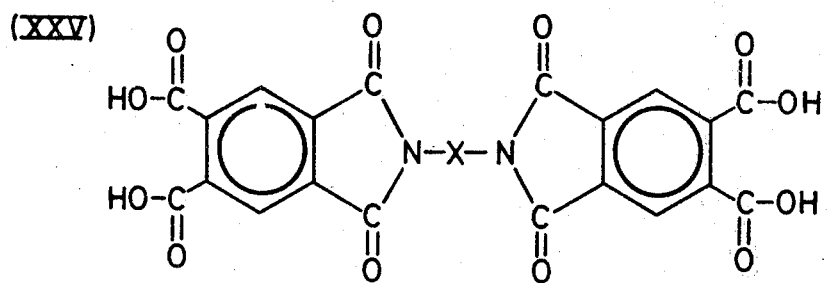
(XXV)
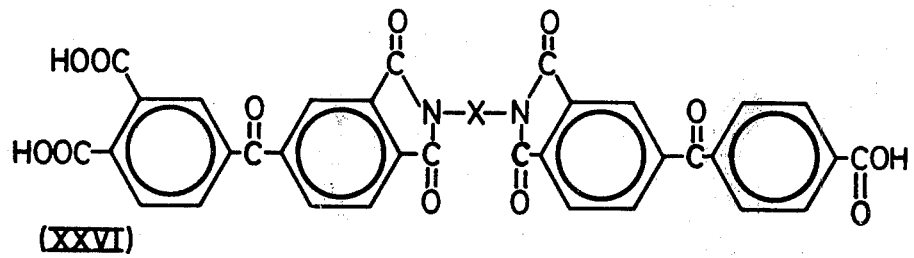
(XXVI)
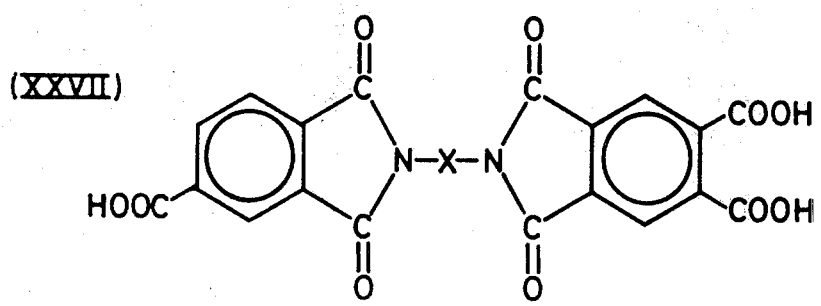
(XXVII)
$X = (CH_2)_m$, $m = 2-8$

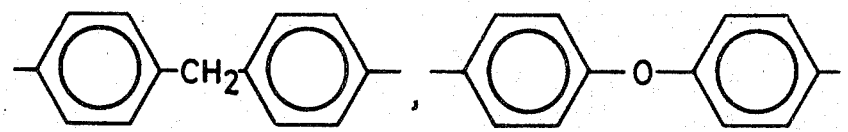
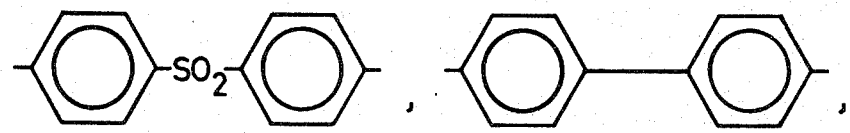
(XXVIIa)
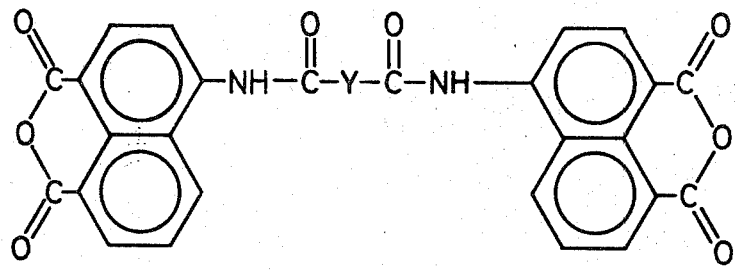
(XXVIII)
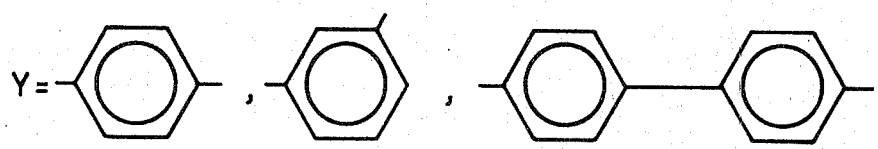
$= (CH_2)_p$   $p = 2-8$   (XXVIIIa)

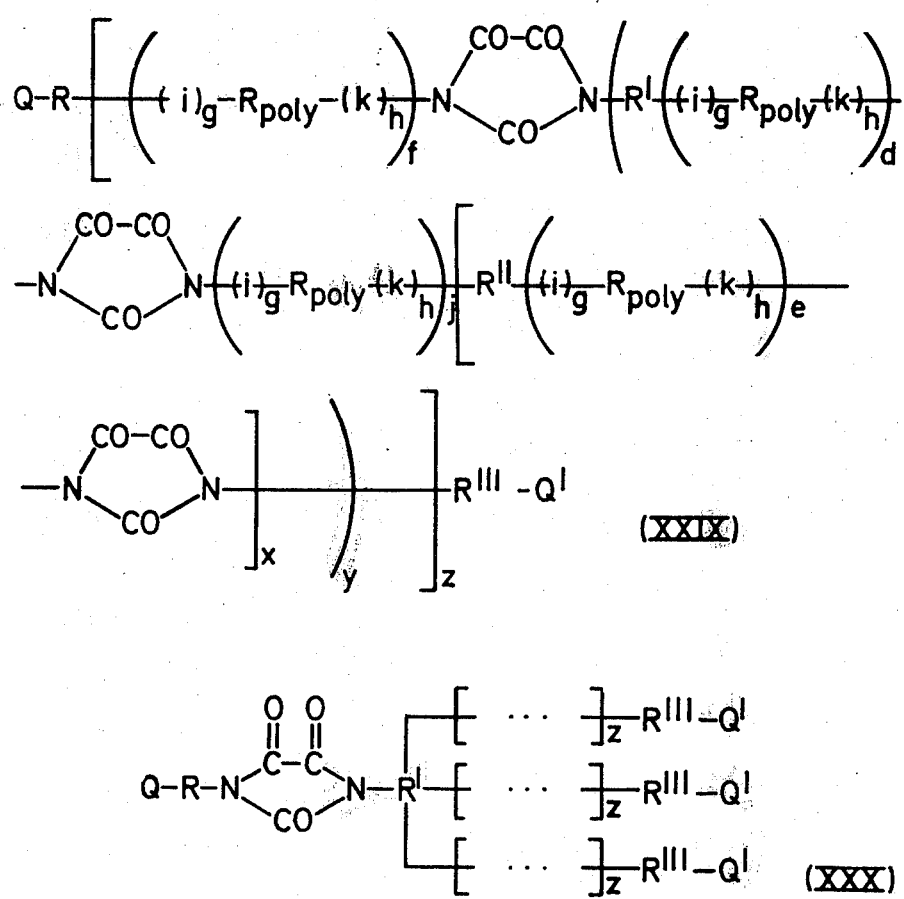

(XXXI) 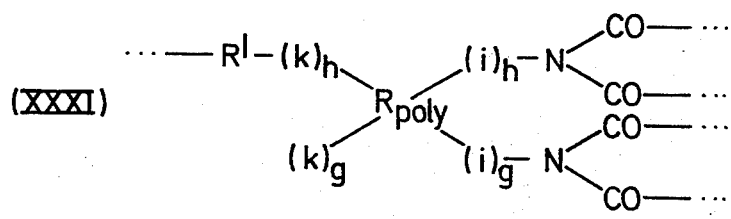
(XXXII) $H_2C=(C_6H_4-NH-CO-COOC_2H_5)_2$
(XXXIII) 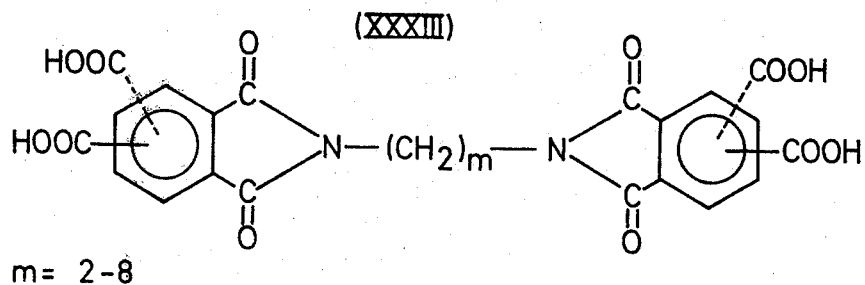
m= 2-8
(XXXIV) 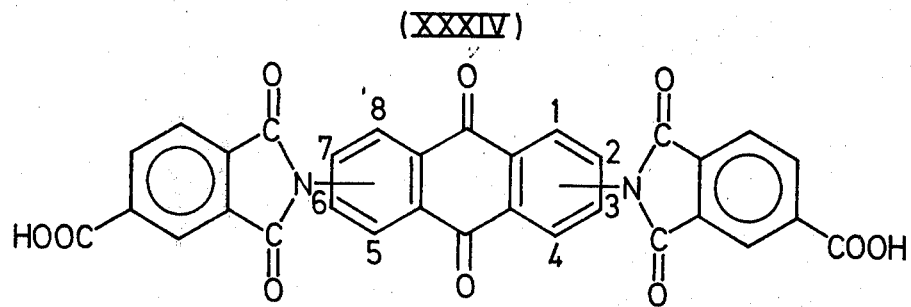
(XXXV) 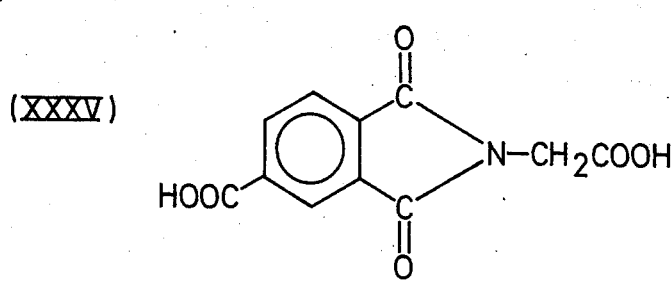

(XXXVI)
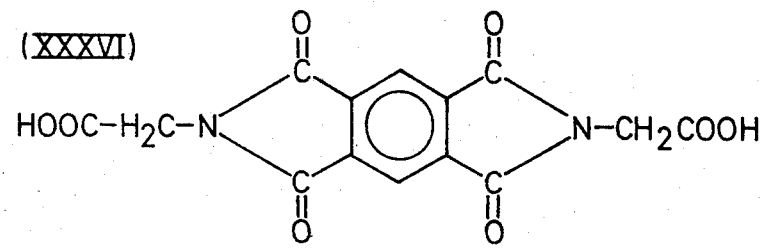
(XXXVII)
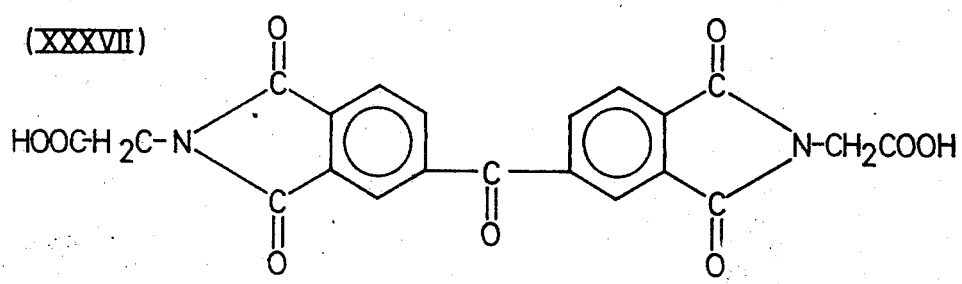
(XXXVIII)
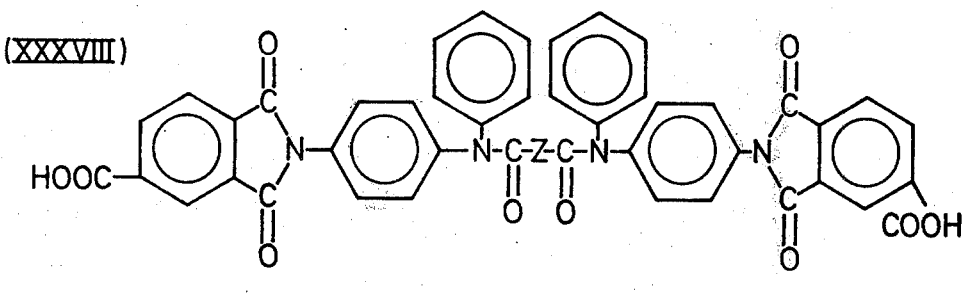
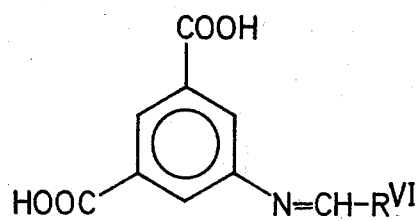
(XXXIX)
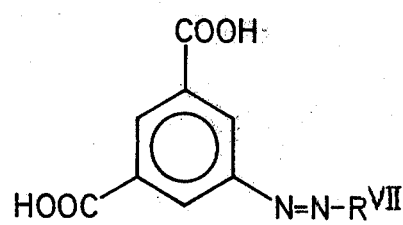
(XXXX)

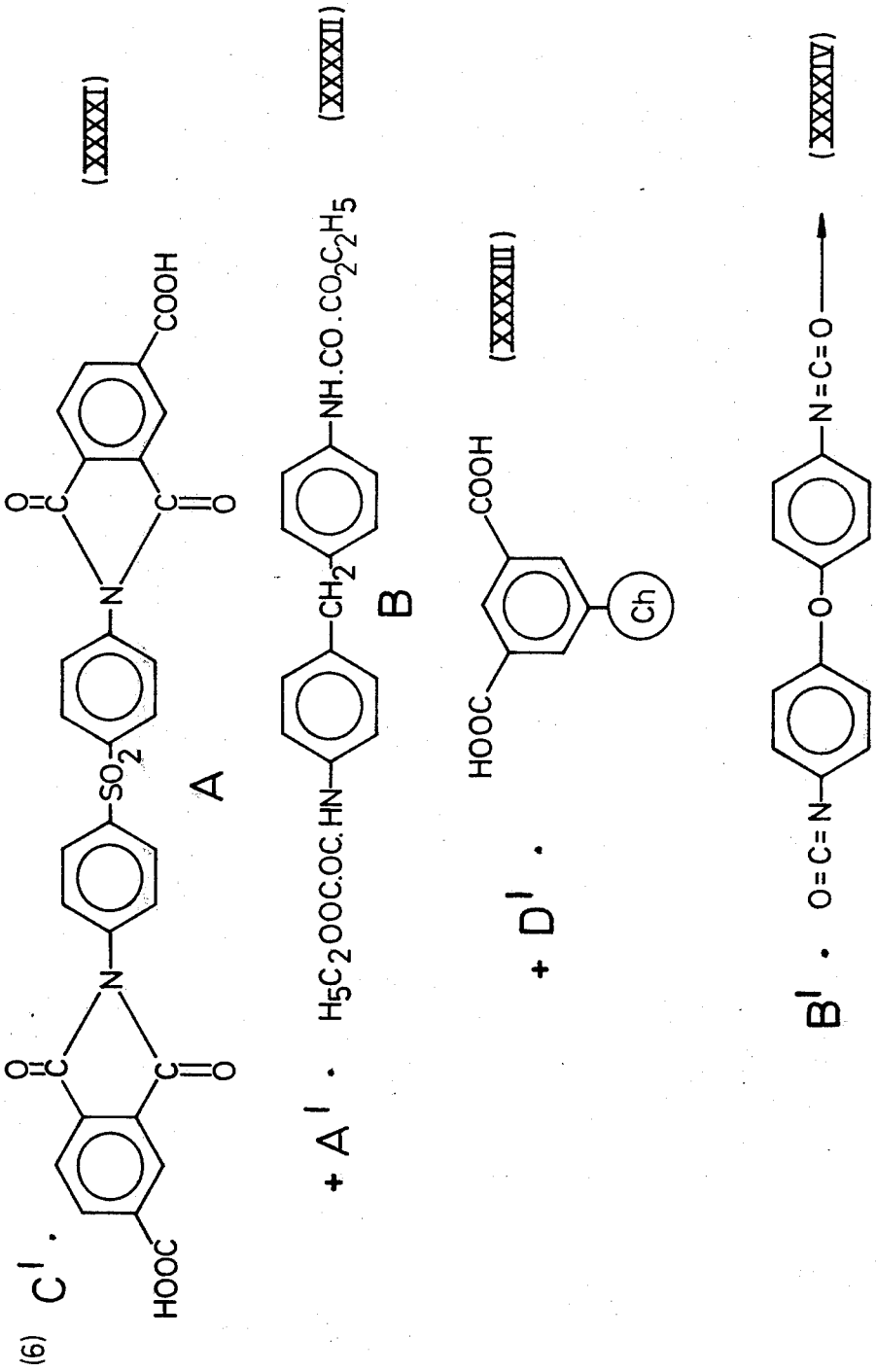

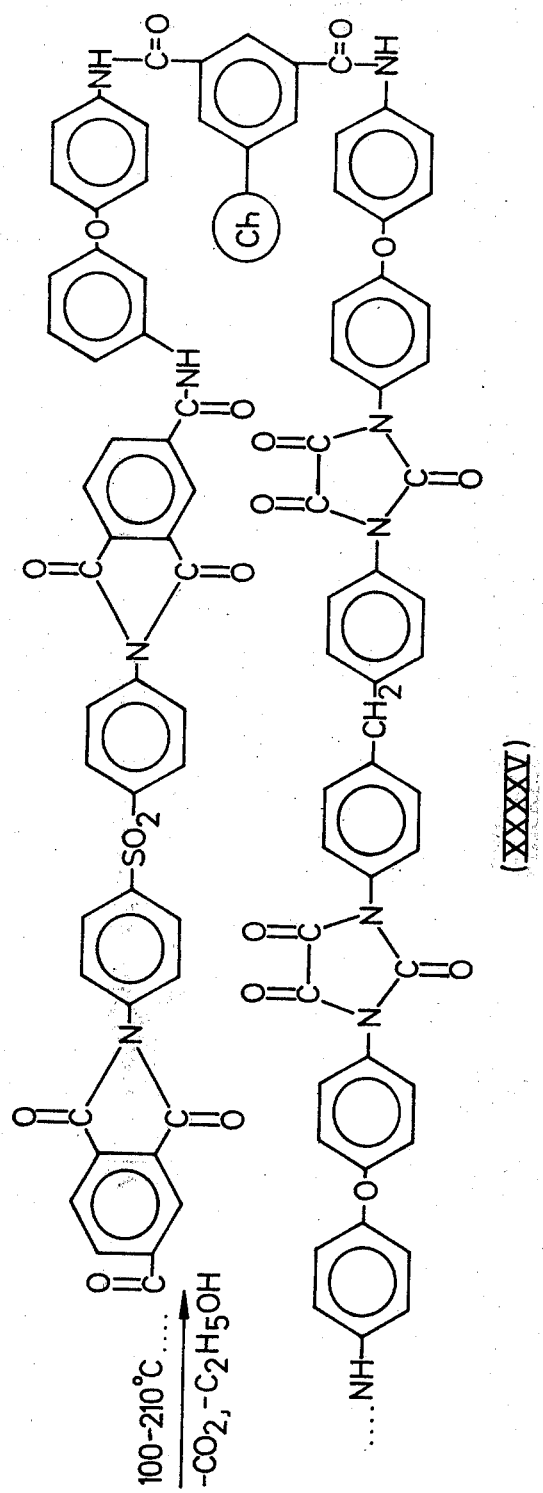

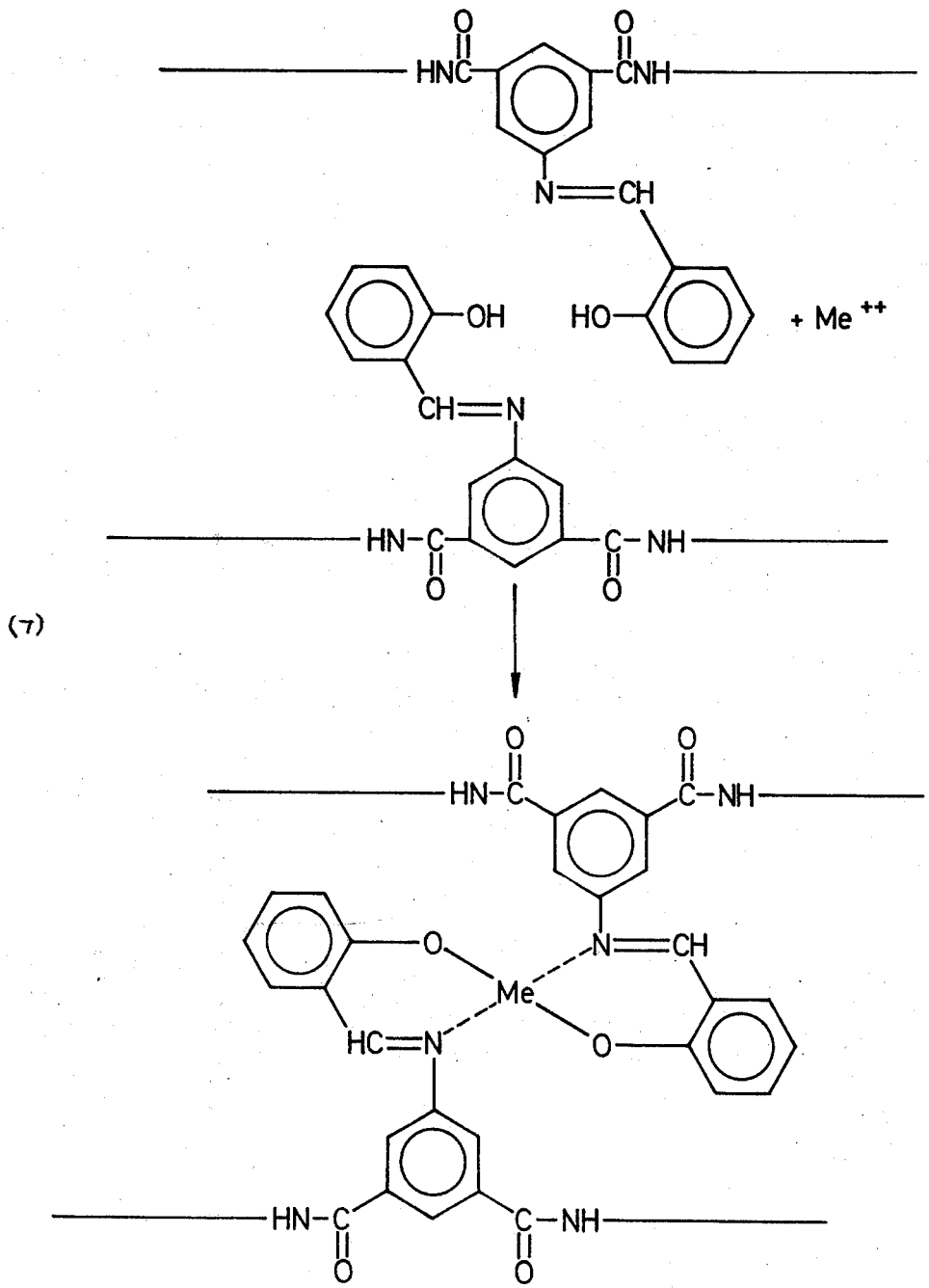
(7)

(7a)
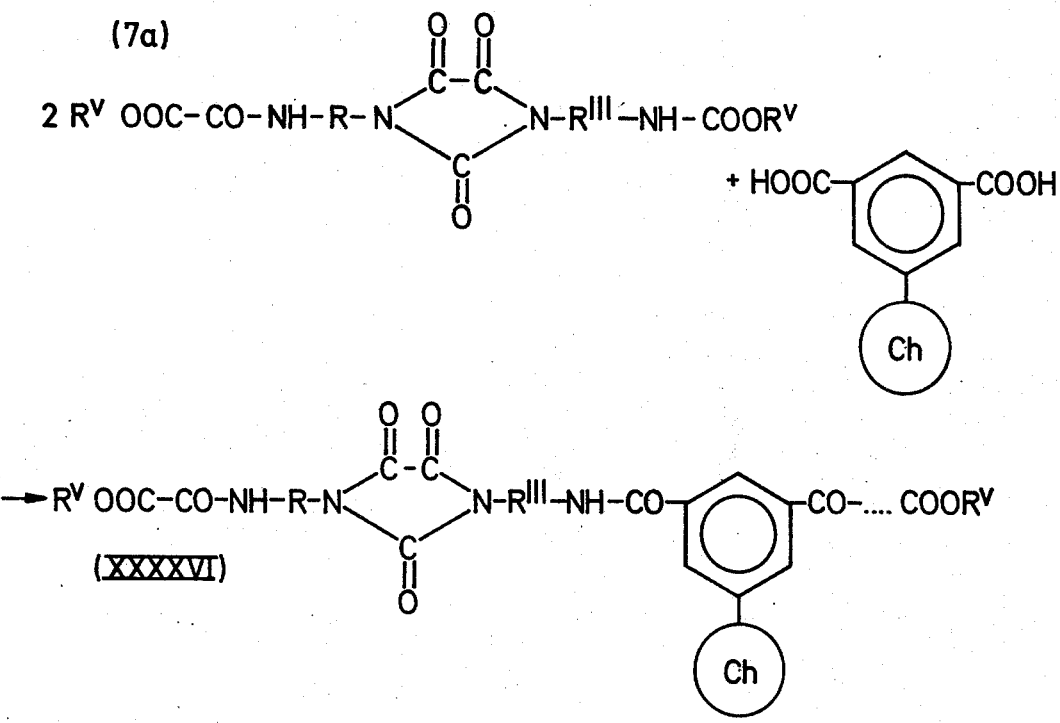
(7b)
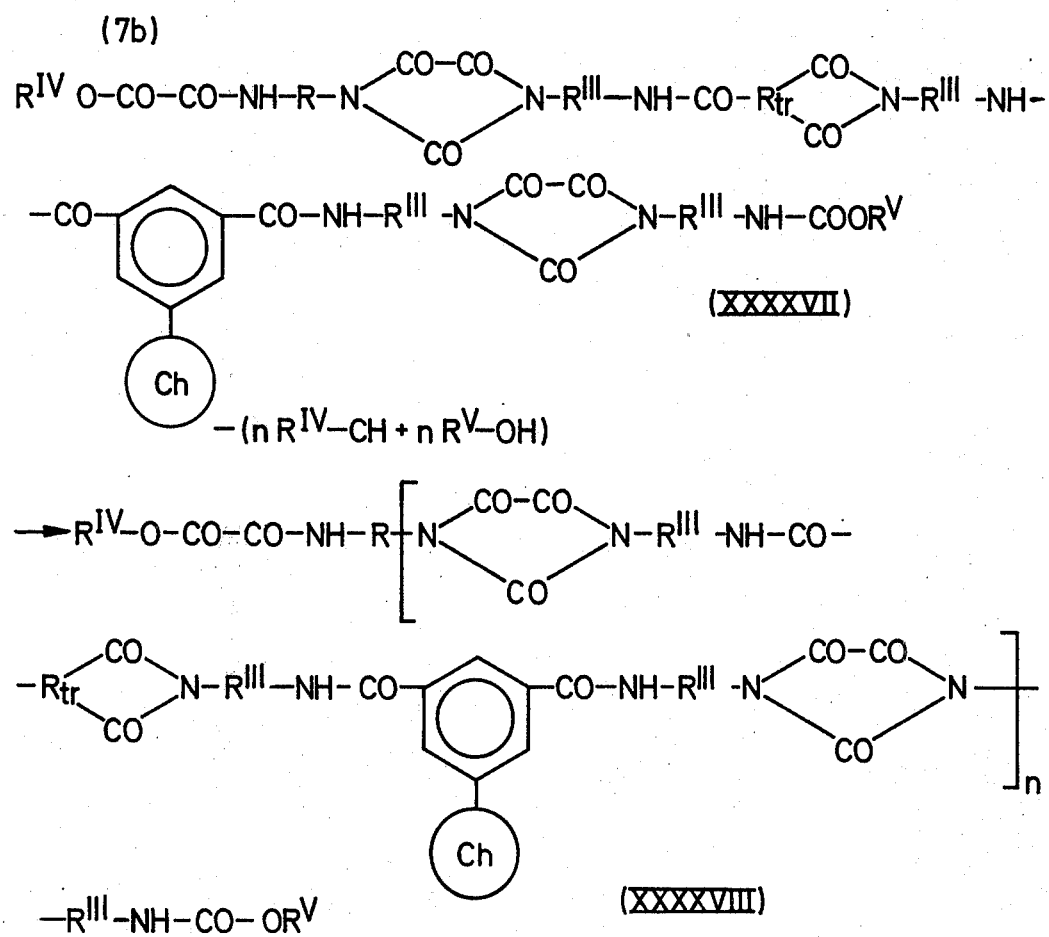

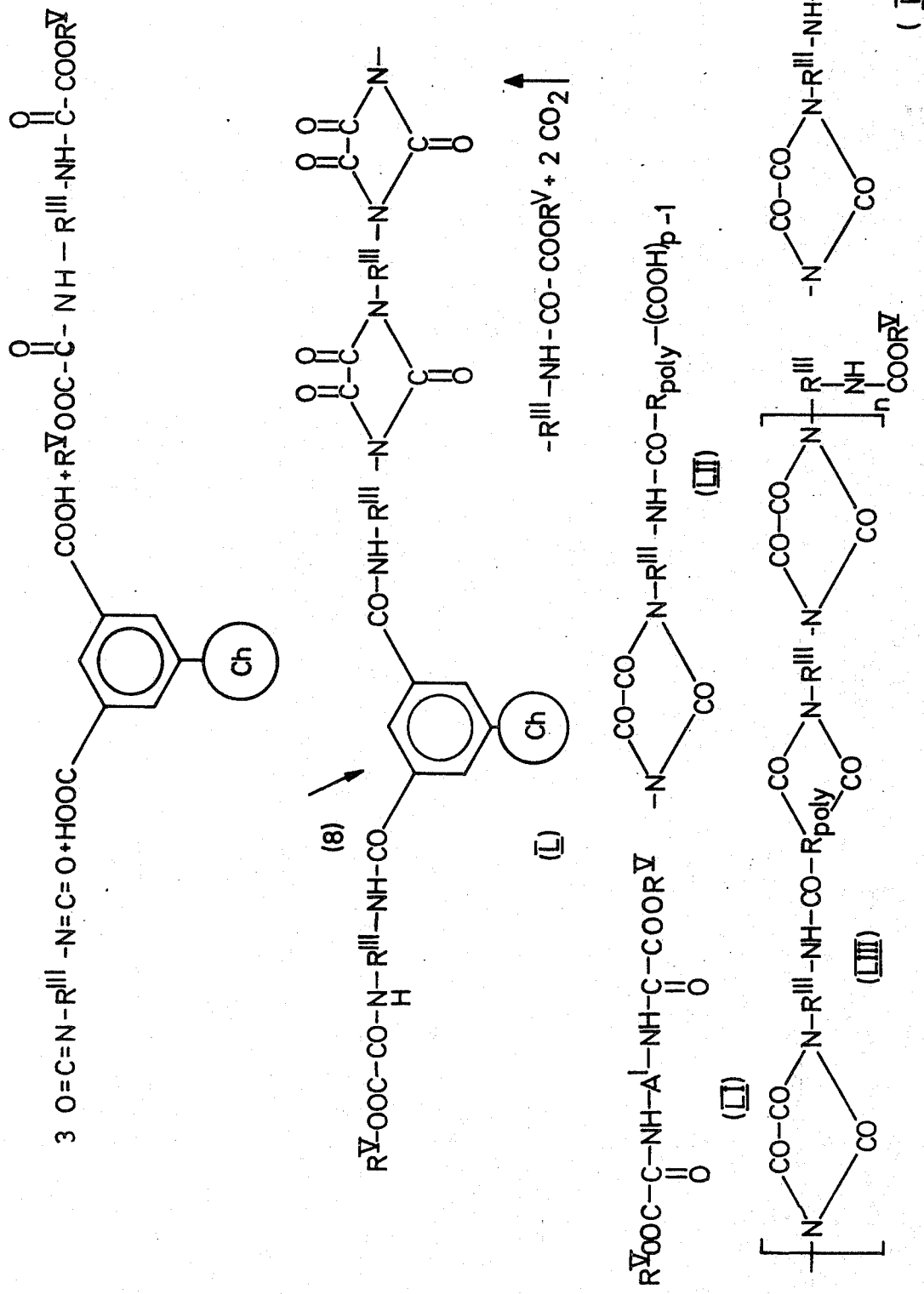

N,N'-SUBSTITUTED 2,4,5-TRIKETOIMIDAZOLIDINES

The invention relates to a process for the preparation of modified, amide and/or imide group containing N,N'-substituted 2,4,5-triketoimidazolidines with improved mechanical properties.

Modified N,N'-substituted 2,4,5-triketoimidazolidines may be prepared by reacting oxamidic esters containing an $NH—CO—CO—OR^v$ group (wherein $R^v$ represents an aliphatic hydrocarbon group containing up to 18, preferably up to 6 carbon atoms, a cycloaliphatic hydrocarbon group containing up to 8 carbon atoms or a mononuclear aromatic hydrocarbon radical optionally substituted by hydrocarbon groups containing a total of up to 14 atoms) with isocyanates or isocyanate yielding compounds, the reaction generally being effected at temperatures of $-20°$ to $280°C$ and optionally in the presence of a catalyst. Polycarboxylic acids may be additionally reacted therewith to form condensation products with amide and/or imide groups, and these products containing polymerisable groups may in some cases be polymerised.

It has also been proposed in this reaction to additionally react azomethines of general formula (XXXIX) as shown in the drawings and/or the metal chelates thereof or azo compounds of formula (XXXX) as shown in the drawings and/or the metal chelates thereof wherein $R^{vi}$ represents a mono- or polynuclear mono- or polyvalent, aromatic radical with 6 to 10 carbon atoms containing a hydroxy group in the ortho position to the azomethine group and which is optionally substituted by at least one alkyl, cycloalkyl, hydroxyl, aryl, aryloxy, carboxyl, acyl or nitro group or by at least one halogen atom, wherein each substituent contains up to 6 carbon atoms and the whole radical $R^{vi}$ contains up to 22 carbon atoms; and $R^{vii}$ represents a mono- or polynuclear, mono- or polyvalent aromatic radical with 6 to 14 carbon atoms containing a hydroxy group in the ortho position to the azo group and which is optionally substituted by at least one alkyl, alkoxy, acyl, carboxyalkyl or fluorinated hydrocarbon group (for example a trifluoromethyl group), or by at least one halogen atom, wherein each substituent contains up to 6 carbon atoms and the whole radical $R^{vii}$ contains up to 22 carbon atoms.

These processes yield polymers with good physical and chemical properties such as good mouldability, tensile strength, thermal stability and shelf life. These polymers are suitable for example for the manufacture of thermostable wire enamels. If, however, high molecular weight products are to be obtained, several reaction steps are necessary. Thus not only does the whole process become cumbersome but also undesirable side reactions may appear. It was therefore desirable to simplify the process and at the same time to improve the quality of the products as far as possible.

Thus according to the present invention there is provided a process for the preparation of modified N,N'-substituted 2,4,5-triketoimidazolidines which comprises reacting a precondensate having terminal isocyanate groups (prepared by reacting (a) a polybasic carboxylic acid, containing from 4 to 70 carbon atoms and from 2 to 6 carboxyl groups, with an excess of (b) one or more isocyanates or isocyanate forming compounds in the presence of a solvent) with c) at least one oxamidic ester containing the group $NH—CO—CO—OR^v$ (wherein $R^v$ represents an aliphatic hydrocarbon group containing up to 18 carbon atoms, a cycloaliphatic hydrocarbon group containing up to 8 carbon atoms or a mononuclear aromatic hydrocarbon group optionally substituted by one or more hydrocarbon groups and having a total of up to 14 carbon atoms) in the presence of a solvent.

Oxamidic esters preferably used contain the group $NH—CO—CO—OR^v$ (wherein $R^v$ represents an aliphatic hydrocarbon group containing up to 6 carbon atoms).

In general the products of the process according to the invention have improved elasticity and elongation at break compared with the products of previously known processes.

The reaction in both steps is performed at temperatures between $-20°$ and $+280°C$. Thus, the precondensate formation is generally carried out at lower temperatures than the reaction with the oxamidic ester. In general, the precondensate formation is carried out at a temperature of up to $70°$, preferably at $40°$ to $60°C$. The reaction with the oxamidic ester is generally effected at temperatures from $70°$ to $270°C$, preferably $100°$ to $220°C$. The temperature may, if desired by obtained by heating the oxamidic ester and solvent up to $70°$ to $270°C$ and then introducing the precondensate.

The preparation of the polycondensate and/or the reaction thereof with the oxamidic ester is preferably effected in the presence of a catalyst. Preferred catalysts include those employed in other reactions of isocyanates with compounds with reactive hydrogen atoms, for example tertiary organic bases (for example triethylamine, tributylamine, N-isobutylmorpholine, pyridine, N-methylpiperidine, N,N'-dimethylpiperazine, N,N-dimethylaniline, triethylenediamine, N,N'-tetramethylethylenediamine, N,N'-tetramethyl-hexamethylene diamine, 1,5-diazabicyclo (3,4,0)-non-5-en and 1,8-diazabicyclo (5,4,0)-undec-7-en), phosphoric acid amides, (for example hexamethylphosphoric acid triamide), phosphines (for example triphenylphosphine, and trimorpholinophosphine), heavy metal compounds (for example metal chelates such as iron acetylacetonate, ferrocene (= dicyclopentadienyl iron (II)) and cobalt complexes), alcoholates and phenolates of metals of groups I to IV of the Periodic Table (for example lithium methylate, lithium benzoate, sodium ethylate, potassium tertiary butylate), alkyltitanates, (e.g. tetrabutyltitanate), organotin compounds (for example dibutyltin oxide, dimethyltin stearate, dibutyltin glycolate, dibutyltin dilaurate, diphenyltin oxide) and calcium carbonate and combinations thereof.

In general linear products are preferred. Thus the reaction is preferably carried out in such a way that the ratio of the number of equivalents of polycarboxylic acid to the number of equivalents of isocyanate present in the precondensate is $q : (q + 1)$ wherein q is an integer from 2 to 40, preferably from 5 to 25. This has the advantage that the precondensate has isocyanate terminal groups and because of the presence of only one excess isocyanate group, a linear prepolymer is formed. When q is within the range of 2 to 40, prepolymers with a molecular weight that is neither too low nor too high are obtained so that the products have the optimum properties for processing. The molecular weight of the precondensate can be controlled by the selected value of q for both reaction partners.

It is also possible to increase the molecular weight of both low and high molecular, for example oligomeric, reaction products containing polymerisable groups prepared according to the invention by thermal treatment at temperatures from 120° to 550°C, preferably above 200°C, e.g. from 260° to 480°C, especially from 280° to 450°C and thus to obtain products having an extraordinary thermal stability which are practically insoluble in conventional solvents.

According to a preferred embodiment of the process according to the invention at least one azomethine compound of formula XXXIX (wherein $R^{VI}$ represents a mono- or polynuclear, mono- or polyvalent aromatic radical with 6 to 10 carbon atoms containing a hydroxy group in the ortho position to the azomethine group, optionally substituted by at least one alkyl, cycloalkyl, hydroxy, aryl, aryloxy, carboxyl, acyl or nitro group or by at least one halogen atom, wherein each substituent contains up to 6 carbon atoms and the whole radical $R^{VI}$ contains a maximum of 22 carbon atoms) and/or a metal chelate thereof or at least one azo compound of formula XXXX (wherein $R^{VII}$ represents a mono- or polynuclear, mono- or polyvalent aromatic radical with 6 to 14 carbon atoms containing a hydroxy group in the ortho position to the azo group and which is optionally substituted by at least one alkyl, alkoxy, acyl, carboxyalkyl or fluorinated hydrocarbon group) or by at least one halogen atom, wherein each substituent contains up to 6 carbon atoms and the whole radical $R^{VII}$ contains a maximum of 22 carbon atoms) and/or a metal chelate thereof is additionally included in the reaction with the oxamidic ester.

The total amount of chelate forming azo or azomethine compounds or metal chelate thereof used is generally up to 50 mol equivalent %, for example at least 0.1, preferably from 5 to 20 mol equivalent % and the total amount of oxamidic ester used is up to 94 mol equivalent %, for example at least 1, preferably 2 to 80 mol equivalent %, calculated on the total molar amount of oxamidic ester, azo or azomethine compounds or their metal chelates and polycarboxylic acids, the total mol number of these three components always amounting to 100 mol per cent.

The mol ratios of the oxamide, isocyanate and polycarboxylic acid components may be varied within wide limits in the reaction of the precondensate with the oxamidic ester. The total number of molar equivalents of oxamidic ester + polycarboxylic acid used may, if desired, be approximately equal to the number of molar equivalents of isocyanate. Analogous is the molar ratio provided the same functionality of said components. This can be represented by the following equation:

$$(A' + C') = B'$$

wherein
A' represents the number of mols of oxamide
B' represents the number of mols of isocyanate
C' represents the number of mols of polycarboxylic acid This is shown in equation (8) of the drawings.

It is however also possible to use either an excess of the oxamidic ester or of the precondensate containing isocyanate groups whereby the component which is in excess then provides the terminal groups of the polymeric end products. In this way, the character of the end groups can be controlled. Independent of these reciprocal mol ratios (which are analogous to the mol equivalent ratio), which are important for the structure and properties of the end products, the above named mol equivalent ratio $q:(q+1)$ applies to the preparation of the precondensate. The amount of polycarboxylic acid component (a) present during the reaction with the oxamidic ester is suitably 5 to 95, preferably 10 to 80 mol equivalent %, and that of the oxamidic ester (c) 95 to 5, preferably 90 to 20 mol equivalent %, both referred to the amount of isocyanate used.

The oxamidic ester, isocyanate, polycarboxylic acid azo or azomethine components may each be present in the reaction mixture as single compounds or as mixtures of compounds.

Advantageously a chelate forming metal compound is added to the reaction mixture in an amount which is equimolecular with the number of chelate forming groups.

In general in the process according to the invention only bifunctional compounds are used. It is preferred that at least an essential amount of at least one bifunctional isocyanate, oxamidic ester or polycarboxylic acid is present in the reaction mixture. However, in some cases, for example to increase softening points and the surface hardness of the products, it may be desirable to use more than bifunctional reaction components. These should then however be present only in subordinate amounts. The concentration of the tri- or higher functional components, for example of the isocyanates, oxamidic esters or polycarboxylic acids, should therefore not generally exceed 0.01 to 2, preferably 0.1 to 0.8 mol per cent, referred to the total amount of that component type present since otherwise the optimum properties of the polycondensation products are not obtained.

Products of the process in accordance with the invention are for example compounds of formulae (XXIX) and (XXX). All formulae numbers and radical symbols refer to the formula drawings. In the compounds of formulae (XXIX) and (XXX) and the equations (2) to (5), which represent the general reactions, R represents a mono- or polynuclear, mono- to hexavalent (in the equations (2) to (2a) however, represented only as a bivalent radical), carbocyclic, preferably aromatic, or heterocyclic radical containing up to 20 carbon atoms optionally substituted by one or more halogen atoms or by one or more nitro, ketoalkyl, alkyl keto, trifluoromethyl, dialkylamino, diarylamino, alkylarylamino groups, alkylsulfonyl, arylsulfonyl, cyano or ester groups, or by one or more unhalogenated or halogenated alkyl (including cycloalkyl), alkoxy, carboxyalkyl, carboxyaryl or acyl, for example acetyl, aroyl, cycloalkyl groups, containing up to 20, preferably up to 18 carbon atoms, wherein the aromatic radicals in certain cases may also be chinoid and wherein any polyvalent aromatic groups may optionally be linked with one another by aliphatic radicals or hetero atoms;

R' is as hereinabove defined for R or represents an aliphatic hydrocarbon group containing up to 18 carbon atoms or a cycloaliphatic hydrocarbon group containing up to 12 carbon atoms;

R'' is as hereinbefore defined for R and may be identical with or different from R;

R''' is as hereinbefore defined for R' with the proviso that R''' is mono- to tetravalent, and may be identical with or different from R';

$R_{tr}$ represents a trivalent aliphatic, carbo- or heterocyclic, mono- or polynuclear hydrocarbon group containing from 2 to 20 carbon atoms, for example a cycloaliphatic, aliphatic-aromatic or aromatic hydrocarbon group, optionally substituted by halogen atoms or by alkyl or amino groups; $R_{poly}$ represents a bi- to hexa-, preferably up to trivalent, aliphatic, carbo- or heterocyclic, mono- or polynuclear hydrocarbon group containing from 2 to 20 carbon atoms, for example cycloaliphatic, aliphatic-aromatic or aromatic hydrocarbon group, optionally substituted by halogen atoms or by alkyl or amino groups, wherein the aliphatic radical is saturated or singly or multiply, for example doubly, olefinically unsaturated; in formula (XXX) Q and Q' are oxamidic ester groups, urethane groups or isocyanate groups.

$x$ is zero, when $y = 1$, or 1;

$y$ is zero, or an integer from 1 to 70;

$z$ is an integer from 1 to 6, preferably 1 to 3 and at least 2 if Q = zero;

$i$ and $k$ may be either the same or different and may represent —NH—CO or

$g$ and $h$ are 1 or 2, the sum of $g$ and $h$ never being more than 3;

$d, e, f,$ and $j$ are 1 or zero, the sum of $(d + e + f + j)$ being at least 1. One of the radicals R and R''' is always aromatic and, if R''' is aliphatic or cycloaliphatic, the radical R, R' or R'' adjacent to R''' is always aromatic. The radicals R, R', R'' and R''' may because of their polyfunctionality, be branched (compare also formula XXIX and XXX).

The radical $R_{poly}$ may be replaced in formulae (XXIX) and (XXX), at least partially, by radicals of the azo or azomethine compounds (XXXIX) and (XXXX).

Suitable solvents for both the preparation of the precondensate and the reaction with the oxamidic ester include, for example, phenols with up to 10 carbon atoms (for example phenol, the various cresols and xylenols and mixtures of technical phenols), aprotic solvents (for example dimethylformamide, dimethylacetamide, dimethylsulfoxide, N-methylpyrrolidine, N,N,N',N'-tetramethylurea, N,N',N''-hexamethylphosphoric acid triamide, acetonitrile, ketones such as acetone, methyl ethyl ketone, dibutylketone, cyclohexanone, acetophenone and isophorone, nitrobenzene, pyridine and tar based mixtures) and mixtures thereof. Additionally up to 30 per cent by weight referred to the total weight of solvent, of at least one higher boiling aromatic or hydroaromatic hydrocarbon (for example diethylbenzene or decahydronaphthalene) or at least one glycol ether (for example diethylene glycol dimethyl ether or butane-diol diethyl ether) may be mixed with the above named solvents. Such solvent mixing may take place prior, during, or, if a solution of the product is to be prepared, also after the completion of the reaction.

Solutions of polymers are obtained. These solutions may be used as such or by suitable precipitation with other solvents in which the reaction products according to the invention are insoluble or only slightly soluble with difficulty (for example aliphatic, cycloaliphatic and/or aromatic hydrocarbons, such as ligroin, benzene and cyclohexane, halogenation products of hydrocarbons such as chlorobenzene and carbon tetrachloride, water, alcohols, acetone, and low molecular weight esters such as ethyl acetate and butyl acetate) they may be obtained for example in solid form as powders with a colour of varying intensity. They may however also be obtained from the solution in solid form for example by volatilation of the solvent, e.g. by vacuum spray drying. Depending on the structure of the reaction products, the above-identified solvents may be used individually or in admixture to precipitate the product.

The process according to the invention may be used for the preparation of symmetrical or asymmetrical triketoimidazolidine compounds. Asymmetrical triketoimidazolidines may be obtained by using a polycarboxylic acid of formula (XXVII), wherein X represents the group $(CH_2)_m$ wherein $m$ is an integer from 2 to 8.

If relatively low molecular weight products are desired, at least one monofunctional reaction component is used as starting material, for example, a monoisocyanate or monooxamidic ester. The proportion of monofunctional starting materials should however be no more than 5 mol per cent in total, calculated on the total mol volume of the components (b) and (c). If monofunctional components are also used in the preparation of the precondensates, monofunctional precondensates can be obtained which can then be reacted with polyvalent oxamides to give comparatively low molecular weight end products. Further by using monofunctional components in the reaction of the precondensate with the oxamidic ester, low molecular weight end products may again be obtained. It is however, also possible to use additional monofunctional components both for the preparation of the precondensates and the end products. Moreover, high molecular weight polymers can be prepared from products prepared in accordance with the invention containing polymerisable groups, for example the group —NH—COOR$^{IV}$, —NH—CO—COOR$^V$ (designated Q and Q' below), —COOH, —COOR$^V$, —COOR$^{IV}$ and —N=C=O, [wherein R$^{IV}$ and R$^V$ which may be the same or different, represent aliphatic hydrocarbon groups containing up to 18, preferably up to 6 carbon atoms, cycloaliphatic hydrocarbon groups with up to 8 carbon atoms, and mono-nuclear aromatic hydrocarbon groups with 6 carbon atoms optionally substituted by, preferably aliphatic, hydrocarbon radicals having a total of up to 14 carbon atoms], in accordance with equation 7b. In this equation $n$ is a whole number from 1 to 80, preferably 1 to 70 and especially up to 50.

This polymerisation reaction is effected by heating low molecular reaction products obtained in accordance with the invention, whether in solution or after their separation from the solution, for example in the fused or solid state, at 120° to 550°C, preferably at least 200°C, for example at 280° to 450°C. Chemical-resistant, temperature-resistant, practically insoluble film-forming polymers are thereby produced. If a sufficiently high reaction temperature is chosen, for example, from 150° to 300°C, the reaction of the terminal groups Q and Q' proceeds with adequate velocity. By "polymerisation", chain extension through addition and/or condensation is to be understood. The polymers can be separated by precipitation and filtration. They are generally light yellow to brownish powders which may be surprisingly soluble. They are separated from such a solution, practically unchanged, by the addition of, for example, water, alcohol or the like. The compounds are therefore obtained as powders or as crystalline, for example also microcrystalline substances.

Depending on the selected reaction conditions, more or less polymerised products can be prepared by means of the process according to the invention (compare formula (XXXXVIII), in which n for example may be a whole number from 1 to 80). As a rule, and contrary to what would be expected, the products have a comparatively good solubility in conventional solvents which do not contain reactive protons (= "aprotic"), for example dimethylformamide, N-methylpyrrolidone, dimethylsulfoxide and N,N',N''-hexamethylphosphoric acid triamide. It is even possible to obtain without difficulty 30 to 70 per cent solutions in the above named aprotic solvents without their viscosity being very high. The solutions remain unchanged also during storage and do not tend to crystallize out. These properties permit versatile application of the products prepared in accordance with the invention, and aid the production of polymeric heterocyclic compounds. Because of the high molecular weight, the products show an improvement in their film forming properties and a high thermal stability. After curing, polymers are obtained which are insoluble in most solvents. This can for example be an advantage in their use for the preparation of chemically resistant mouldings.

The thermostability is particularly high in products with a low hydrogen content, especially however in those having little or no aliphatically or cycloaliphatically bound hydrogen in the hetero ring system. The films and foil obtained from the products of the invention are furthermore distinguished by very good elasticity properties. Their adhesion to metal surfaces is very high.

Suitable oxamidic esters for the process according to the invention are compounds of formula VIII (wherein R and $R^v$ are as hereinbefore defined and r is an integer from 1 to 6) for example bis-oxamidic esters of formula (LI) (wherein A' represents an optionally substituted, bivalent, cyclic, preferably aromatic, group with up to 12 carbon atoms in the ring system which may be substituted up to 4 times). The oxamidic esters in accordance with formula (VIII) may therefore have one to six ester groups.

In particular, in formula (VIII) the group R may have one of the following meanings:

aa. an at least mono-nuclear, mono- to hexavalent aromatic radical with 6 to 20 carbon atoms, bb. an at least mono-nuclear, mono to hexavalent heterocyclic radical with 6 to 20, preferably up to 12 carbon atoms, cc. a radical as defined in aa) which is substituted by at least one halogen atom or by at least one nitro, dialkylamino, diarylamino, alkylarylamino, alkyl, alkoxy, carboxyalkyl, carboxyaryl, acyl, cycloalkyl, halogenated alkyl, halogenated alkoxy, halogenated carboxyalkyl, halogenated carboxyaryl or halogenated acyl groups with up to 18 carbon atoms, dd. a radical as defined in (bb) which is substituted with at least one halogen atom or by at least one nitro, dialkylamino, diarylamino, alkylarylamino, alkyl, alkoxy, carboxyalkyl, carboxyaryl, acyl, cycloalkyl, halogenated alkyl, halogenated alkoxy, halogenated carboxyalkyl, halogenated carboxyaryl or halogenated acyl group with up to 18 carbon atoms, ee. a quinone radical,
wherein in formula (VIII) the polyvalent aromatic radicals are interconnected directly or via an aliphatic radical or an hetero atom.

The products in accordance with the invention may therefore contain any of the groups of formulae (LII) to (LIV) (wherein $R'''$, $R_{poly}$, $R^v$ and p are as hereinbefore defined).

The radical R in the oxamides is preferably a carbocyclic or heterocyclic radical, preferably an aromatic radical. It may for example be a phenyl, naphthyl, benzolazophenyl, benzothiazolylphenyl, anthraquinonyl, or pyridyl group.

Suitable bis-oxamidic esters are those wherein R represents one of the bifunctional groups of formulae (XII) to (XV) [wherein X represents a $-CH_2-$, $-O-$, $-S-$, $-S-S-$, $-SO_2-$, $-N=N-$ or $-NR^{VII}-$ group (wherein $R^{VII}$ represents an aliphatic, cycloalphatic or aromatic radical with up to 8 carbon atoms)], or a diphenylene, dimethyldiphenylene, anthraquinonylene, pyridylene, quinonylene, thiophenylene, benzofurylene or N-methylcarbazolylene group. The radical R may moreover be substituted in one or more of the aromatic and/or heterocyclic nuclei or in the side chain singly or multiply as long as the substituents do not react with the isocyanates under the reaction conditions used. These substituents may be alkyl, alkoxy, halogenated alkyl, ester, alkylketo, ($\omega - m$) ketoalkyl or alkylsulphonyl groups, each with 5 carbon atoms and wherein m is an integer from 1 to 3. Other suitable substituents include $CH_3$, $C_2H_5$, $OCH_3$, $OC_2H_5$, $CF_3$, $COOC_2H_5$, $CN$, $COCH_3$, $SO_2CH_3$, nitro and cyano groups as well as halogen atoms, especially F, Cl, Br. In a similar manner tris- and/or tetrakis-oxy amide esters may be used either by themselves or mixed with the bis-oxamidic esters. A suitable oxamide ester containing the radical of formula (XIII) is for example compound XXXII.

The groups $R^{IV}$ and $R^V$ in the oxamide esters used are for example alkyl groups with up to 6 carbon atoms, preferably $CH_3$, $C_2H_5$ or $C_4H_9$, phenyl groups or phenyl groups substituted by alkyl groups, for example the above-identified groups.

Suitable isocyanates for the process according to the invention include for example those of general formula (IX) (wherein $R'''$ is as hereinbefore defined and s is an integer from 1 to 4).

Preferred isocyanates of general formula IX are those wherein $R'''$ is selected from the following:

b 1. an at least mono-nuclear, mono- to tetravalent carbocyclic radical with 6 to 30 carbon atoms, b 2. an at least mono-nuclear, mono- to tetravalent heterocyclic radical with from 6 to 40 carbon atoms, b 3. a radical as defined in (b 1) which is substituted by at least one halogen atom or by at least one nitro, alkyl, alkoxy, carboxalkyl, carboxyaryl, acyl, cycloalkyl, halogenated alkyl, halogenated alkoxy, halogenated carboxyalkyl, halogenated carboxyaryl or halogenated acyl group with up to 18 carbon atoms, b 4. a radical as defined under (b 2) which is substituted by at least one halogen atom or by at least one nitro, alkyl, alkoxy, carboxyalkyl, carboxylaryl, acyl, cycloalkyl, halogenated alkyl, halogenated alkoxy, halogenated carboxyalkyl, halogenated carboxyaryl or halogenated acyl with up to 18 carbon atoms, b 5. an aliphatic radical with 1 to 20 carbon atoms.

Suitable isocyanates are those wherein $R'''$ represents for example a mono to tetravalent, aliphatic, cycloaliphatic, aromatic or mixed aromatic-aliphatic radical containing in general up to 20, preferably up to 15, carbon atoms, for example a cyclohexyl, butyl, octyl, octadecyl, ethylene, propylene or butylene group or one of the groups of formulae (XII) and (XIII) (wherein X represents $CH_2$ or O) or of formulae (XVI) to (XIX).

These radicals may if desired be substituted singly or multiply, for example by at least one alkyl, alkoxy or halogenated alkyl group with up to 5 carbon atoms each, or by at least one nitro group or halogen atom, especially F, Cl, Br, (e.g. $CH_3$, $C_2H_5$, $OCH_3$, $OC_2H_5$, $CF_3$). Several aromatic rings may be connected via —$CH_2$—, —O—, —S—, —S—S—, —$SO_2$—, —CO— or —N=N— bridges. Suitably each R''' radical contains not more than 5 such substituents.

Suitable bivalent isocyanates are, for example, 4,4'-diisocyanato-diphenyl ether, 4,4'-diisocyanate-diphenylmethane and 2,4-tolylene-diisocyanate.

Among the diisocyanates represented in equation (4) are furthermore to be understood those which, are for example, according to equation (5) can be built up from monomeric diisocyanates and dicarboxylic acids in known manner. It is also possible that in the compound IL, the polycarboxylic acid radical is replaced, at least partially, by an imide group according to formula (VII).

Suitable tri- and tetravalent isocyanates are, for example, 2,4,6-triisocyanato-toluene, 4,4'4''-triisocyanato-triphenylmethane, 2,4,4'-triisocyanato-diphenylmethane, 2,2',5,5'-tetraisocyanato-diphenylmethane, moreover trivalent isocyanates of formula (XX) (which, for example, are accessible by adding trimethylolpropane to tolylene-diisocyanate), an isocyanate of formula (XXI) (prepared by reaction of hexamethylene diisocyanate and water) or isocyanates with up to four free isocyanate groups of formula (XXII) (which may for example be prepared by the reaction of tolylene-diisocyanate and hexamethylene-diisocyanate).

The tri- and tetra-isocyanates may also bear the same substituents as those listed above for dissocyanates.

The isocyanates may be used as such or in the form of reaction products with terminal reactive isocyanate groups, or groups yielding isocyanates. The precondensates used in the process of the invention may be prepared from isocyanates and compounds splitting off isocyanates and polycarboxylic acids, (compare also equation (5)). Suitable isocyanates precursors are, for example, urethanes, such as diphenylmethane-4,4'-bis-(carbamic acid phenyl ester), and, disubstituted carbamic acid amides, e.g. diphenyl-4,4'-bis-(carbamic acid diethylamide).

Suitable polycarboxylic acids according to the invention are those of general formula (XXIII) [wherein $R_{poly}$ represents a bi- to hexavalent, preferably trivalent, aliphatic, carbocyclic or heterocyclic mono- or polynuclear, e.g. a cycloaliphatic, aliphatic-aromatic or aromatic, hydrocarbon radical containing 2 to 20 carbon atoms, optionally substituted by at least one halogen atom or by at least one alkyl or amino group, wherein the aliphatic radical is saturated or at least mono-olefinically unsaturated, and $p$ is an integer from 2 to 6].

In particular, the group $R_{poly}$ in compounds of general formula (XXIII) represents one of the following groups:

c 1. an unsubstituted, bi- to hexavalent, at least monocyclic carbocyclic radical containing 6 to 34 carbon atoms,
c 2. an at least mononuclear carbocyclic group containing 6 to 34 carbon atoms being substituted by at least one halogen atom or amino or alkyl group having a total of 1 to 8 carbon atoms,
c 3. an aliphatic bi- to hexavalent hydrocarbon group with 2 to 12 carbon atoms optionally containing at least one double bond,
c 4. a heterocyclic radical with 4 to 69 carbon atoms,
c 5. an aliphatic radical as defined in (c 3), substituted by at least one halogen atom or alkyl or amino group,
c 6. heterocylic group as defined in (c 4) substituted by at least one halogen atom or alkyl or amino group. possibly cases. include for The polycarboxylic acid therefore may be up to hexavalent, in general contains from 4 to 70 carbon atoms and is optionally substituted by chlorine or bromine atoms and/or alkyl groups with up to 6 carbon atoms. It is possible that the polycarboxylic acids are used as such or as anhydrides or possible in combination with amines or in the form of imide or amide group-containing polycarboxylic acids, whereby condensation products with amide and/or imide groups are obtained in the two last casesl Suitable polycarboxylic acid and components for example isophthalic, bromoisophthalic, 5-aminoisophthalic, trimellitic, pyromellitic, terephthalic, 2,4-dianilino-terephthalic, 2,5-ditoluidino-terephthalic, 4-aminonaphthoic, 4,4-methylene-bis-anthranilic, hemimellitic, mellitic, maleic, fumaric, itaconic, muconic, hexahydro-terephthalic, adipic, glutaric, succinic, sebacic, suberic, tetrahydrofuran-tetracarboxylic, benzophenanetetracarboxylic, 1,4,5,8-naphthalene-tetracarboxylic, perylene-tetracarboxylic acids and anhydrides, and benzophenone-hexacarboxylic acid dilactone. Optionally these acids and anhydrides may be substituted by chlorine or bromine atoms and/or by alkyl groups with up to 6 carbon atoms. Moreover, condensed systems containing at least two carboxyl groups in the molecule, such as N,N'-terephthaloyl-bis-glycine, N,N'-isophthaloyl-bis-gylcine, bis-carboxymethylamino-diphenylmethane (or -diphenyl ether or diphenyl sulphone) may be used. Polycarboxylic acids according to formulae (XXIV) to (XXVIIIa) and (XXXIII) to (XXXVIII) are also suitable. The compound (XXXIII) may be a bi-, tri- or tetracarboxylic acid and in compound (XXXIV) the anthraquinonylene group may be substituted in the 1,5- or 1,8-positions. Further suitable polycarboxylic acids are amino group containing polycarboxylic acids, for example amido acids, which have been obtained by reacting maleic anhydride with diaminodiphenylmethane, diaminodiphenyl ether, diaminodiphenyl-sulphone, p-phenylenediamine or m-phenylenediamine with amide formation and liberation of one carboxyl group from the maleic anhydride.

Preferred dicarboxylic acids are those whose carboxyl groups are not in the ortho position and preferred tri- or higher valent carboxylic acids are those wherein at least two carboxyl groups are in the ortho positions because they yield products with a high linearity of the polymeric chain.

Suitable axomethine compounds include for example, reaction products of 5-amino-isophthalic acid and salicylaldehyde, 1-hydroxy-2-naphthaldehyde, 2-hydroxy-1-naphthaldehyde, 4-methylsalicylaldehyde, 4-carboxyethylsalicylaldehyde, 4-methoxysalicylaldehyde, 3-chloro- or 3-bromosalicylaldehyde, 4-acetylsalicylaldehyde, 4-hydroxy-diphenyl-3-aledhyde, 3-hydroxy-diphenyl-4-aldehyde or p-benzyl-salicylaldehyde, (viz. formula (XXXIX)). Suitable azo compounds include for example those prepared by reaction of diazotised 5-aminoisophthalic acid, with one of the following compounds (viz. formula XXXX): p-cresol, 2,4-dimethylphenol, 2,4-ditertiary-butylphenol, p-chlorophenol, 2,4-dichlorophenol, p-hydroxyacetophenone, hydroquinone-monethyl ether, p-cyclohexylphenol, p-octylphenol, β-naphthol, 4-methyl-α-naphthol, 4-bromonaphthol, 4-hydroxydiphenyl, 4-hydroxy-4'-ethoxydiphenyl, 4,4'-dihydroxydiphenylmethane-monomethyl ether.

Suitable chelate forming metal compounds include for example compounds of metals from groups I to VIII of the Periodic Table. However, compounds of lithium, sodium, potassium, zinc, magnesium, barium, aluminium, titanium, lead, chromium, nickel, especially iron, cobalt and copper are preferably used for chelate formation. Particularly suitable for chelate formation are the oxides, hydroxides, carbonates, halides, alcoholates (for example methylates, ethylates and butylates) phenolates, (of cresols and the xylenols as well as those of phenol), acetates, formates, octoates, naphthenates, etc. Metal complexes, for example acetyl acetonates and enolized acetoacetates are also suitable. In these compounds, the metals may be mono-, bi- or higher valent.

The process according to the invention offers further advantages if azomethines or azo compounds are used. For example, the previously known reaction of polycarboxylic acids or anhydrides with polyisocyanates at temperatures above 80°C frequently yields insoluble, imide group containing polymers, whose processing is extraordinarily difficult. However, the reaction of the same reaction partners using an oxamidic ester components as well as an azomethine or an azo compound and/or a metal chelate thereof in the above given quantity ratios yields clear, polymer solutions or polymers that can be readily processed.

In the process according to the invention, the starting compounds of formulae I or IV may provide the terminal groups in the end product. It is however also possible that oximidic ester groups may terminate one or both ends of the product. Thus the terminal groups in the final product may be two oxamidic ester groups, one oxamidic ester group and one urethane or isocyanate group, two urethane groups or two isocyanate groups.

The yields of N,N'-disubstituted 2,4,5-triketoimidazo-lidines by the process of the present invention is generally high, usually over 90 per cent of the theoretical yield.

The compounds obtained in accordance with the invention can be used for example as long-life, thermally stable additives or plastics because of their high stability. The good storage stability is probably governed by the chelate forming groups which trap any metal traces that may be present and which cause resin degration. They may however be further reacted, for example with a chelate forming metal compound to further stabilise them. Alternatively the chelate forming groups present in the reaction products may form further chelate linkages within the molecule. For this reason, it is of advantage to select mono- or polyvalent compounds of such metals that form chelates or complexes. It is however also possible that azomethine or azo compounds or metal chelates thereof may be incorporated into the precondensate before the reaction with the oxamidic ester, e.g. during the formation of the precondensate. At this stage, the azo or azomethine compounds may be reacted as such or in the form of their metal chelates.

The timing of the chelate formation can be selected at random, for example before, during or after synthesis of the polymer chain. It depends on the timing of the addition of the metal compounds.

The incorporation of the chelate forming azo or azomethine compounds, or of the metal chelates, can be effected by a reaction in a suitable solvent with the other components (a) to (c). On the basis of equation 6 — compare also equation 7, 7a, 7b and 8 — the complicated reaction sequence can be illustrated in simplified manner. In equation 6

$A'$ = the number of mols oxamide (XXXXII)
$B'$ = the number of mols isocyanate (XXXXIV)
$C'$ = the number of mols polycarboxylic acid (XXXXI)
$D'$ = the number of mols azo or azomethine compound (XXXXIII)
$(Ch)$ = a chelate forming azo or azomethine radical or a corresponding chelate permits the preparation of low to high molecular weight condensation products (2,4,5-triketoimidazolidines and polyamides, imides or polyamidoimides) which additionally contain chelate or chelate forming groups. Compounds containing all or certain of these groups, particularly the four first-mentioned groups, are distinguished by particularly outstanding processing properties.

The polymeric products prepared in accordance with the invention, in general have a low molecular weight, good properties and can be used with extrordinary versatility. for example for the synthesis of plastics, e.g. polymerisation and condensation resins, for the preparation of mouldings, especially of fibres and films.

They exhibit high thermostability and other favourable mechanical properties, for example high elasticity and elongation at break. Moreover, they have a very uniform mean molecular weight of about 100,000 at maximum (viz. FIG. 1). This high uniformity, apart from the other properties listed, is essential for the good spinning properties of the fibres produced from them and the excellent film forming properties of the binders prepared from them, especially of paints. These mechanical properties are important for films, which may be applied to a substrate or be used for example in the form of foils.

The products and polymers produced in accordance with the invention are moreover particularly suitable for the coating of metallic mouldings such as wires, sheets, boards and tubes, especially electric conductors. They may be used as insulating lacquers, when it is not important whether the product is applied in powder form or in solution. In the same way, they may however also be applied to ceramic components. After thermal polycondensation, thermostable coatings with excellent adhesion and even high temperature resistance are obtained.

The compounds according to the invention are however also suitable, especially in powder form, after mixing with fillers, especially of an inorganic nature, for example mineral powders, glass powder, glass fibres, asbestos fibres, graphite, metal powders and chips, for the preparation of moulded components by the hot compression process. With these fillers, the products prepared in accordance with the invention can be processed at high temperatures, for example at 280° to 500°C, and at high pressure, for example at 50 to 5,000 at, into mouldings. Moreover, glass clear foils, films and fibres can be produced from them.

The products may, if desired, be converted into foam-like materials with high temperature resistance, for example by the addition of propellants, possibly even without such, since alcohols and carbon dioxide liberated during the reaction also act as propellants. They may however also be mixed with such foamed polymers, including polymerisation and/or condensation resins with heterocyclic groups, at temperatures of from $-10°$ to $+250°C$, preferably at $+20°$ to $190°C$, in solution, in the melt or in the solid phase and thereby be converted into moulding and/or coating materials. Another field of application is the preparation of foams with high temperature resistance which are of particular significance for insulation purposes.

Equation (1) of the formula sheet shows the reaction of a starting isocyanate (II) with a starting bis-oxamidic ester (IVa) to form compound (I) which in this case is mononuclear N,N'-substituted triketoimidazolidine.

Equation (2) of the formula sheet represents the reaction of a monoanhydride of a tricarboxylic acid with the starting isocyanate (II) to form the amide (III) with the liberation of carbon dioxide. In a further reaction of this amide with the starting oxamidic ester (IV) the acid-modified triketoimidazolidine (V) is obtained with the liberation of alcohol (cf. equation 3).

Formula (XXXXV) in equation (6) shows the reaction product which has been prepared from the dicarboxylic acid (XXXXI) (=A), the isocyanate (XXXXIV), the chelate compound (XXXXIII) and the oxamidic ester (XXXXII) (=B).

In equation (8) 3 mols of a diisocyanate are reacted with 1 mol of the chelate of isophthalic acid and 1 mol of the bis-oxamidic ester with the liberation of carbon dioxide to form compound (L) which is in acid-modified binuclear triketoimidazolidine also containing a chelate group.

In formula (XXX) (cf. the formula sheet) the bracket with indices z have the same meaning as the bracket with the corresponding index in formula (XXIX).

The symbol (Ch) represents a radical selected from the group consisting of an azo- and azomethine chelate group.

The following Examples serve to illustrate the preparation of N,N'-substituted 2,4,5-triketoimidazolidines according to the invention. All percentages given therein are percentages by weight.

EXAMPLE 1

43.6 parts of 1,3-bis-(carboxyphthalimido)-benzene (0.1 mol), 218.4 parts of 4,4'-bis-(carboxyphthalimido)-diphenylmethane (0.4 mol), 33.2 parts of isophthalic acid (0.2 mol), 1.4 parts of tributylamine and 2.1 parts of diazabicyclooctane are dispersed, while stirring, in a mixture comprising 760 parts of N-methylpyrrolidone and 330 parts of dimethylacetamide and heated to 55°C. After reaching this temperature 75.6 parts of 4,4'-diisocyanato-diphenyl ether (0.3 mol) and 125 parts of 4,4'-diisocyanato-diphenyl methane (0.5 mol) are added rapidly. Subsequently the mixture is stirred at 55°C until within 5 to 6 hours a clear solution is obtained. The precondensate formed is not isolated, but is immediately reacted in a second step in the solution.

26.1 parts of 4,4'-bis-(ethoxyalylamino)-diphenylmethane (0.05 mol) are added whilst stirring and the mixture is maintained for a further 2 hours at 55°C. Finally, heating at 195°C takes place for 1 hour and the polymer formation is completed within 4 hours. The initially rapid evolution of carbon dioxide subsides after this time.

About 1560 parts of a clear, reddish brown, highly viscous polymer-solution are obtained. The real viscosity exceeds 800,000 cP. The solid content of the solution is about 30% by weight.

EXAMPLE 1a (Comparative test)

The starting materials used in Example 1 including the oxamide acid ester in equimolar ratios are brought into solution at 20°C and the mixture is heated in one step for 2 hours at 195°C. Heating is continued until the splitting off of carbon dioxide is completed (about 8 hours). After cooling an extremely highly viscous dark brown polymer solution is obtained. The yield is equal to that obtained in Example 1.

Although the real viscosity exceeds that of the polymers of Example 1, the inherence viscosity is considerably lower. This infers a high degree of branching.

The following Table gives the characteristics of the products (1) and (1a).

Table

| Characteristics | Sample 1 (invention) | Sample 1a (comparison) |
| --- | --- | --- |
| tear elongation % | 30 – 48 | 3 – 10 |
| film formation | very good | good |
| tear strength kg/cm² | 800 – 900 | 700 – 800 |
| storage stability | > 1 year | appr. 6 months |
| inherence viscosity⁺dl/g | 1.7 – 1.9 | 0.8 |
| loss in weight %⁺ | > 0.3 | 0.7 – 0.8 |

⁺measured as a 0.5% solution in N-methylpyrrolidone
⁺⁺50 sec. at 280°C in the air at 20 mm/Hg.

The distribution of the molecular weight of the products according to the invention and of the products of the corresponding comparative tests were examined by means of chromatography.

In the gel-chromatogram the symbol "$\Delta n$" means the difference of the refraction indices between that of the solution flowing out from the chromatograph and that of the pure solvent. $V_E$ means "elution volume" i.e. that quantity of fluid which flows out having passed the gel-chromatograph.

The direction of the arrow below the abscissa is from the right to the left because the high-molecular amounts flow out firstly and the low-molecular amounts are finally obtained. The division-stroke of the abscissa being at the origin of the curve of sample 1a has therefore the value of 0. The gel-chromatography of both samples 1 and 1a gives the following results:

The chromatogram (cf. FIG. 1) of the polymer (sample 1a) prepared according to the known method shows a relatively irregular distribution of the molecular weight. There is a high proportion of high molecular weight particles (maximum 1,600,000) mainly containing branched chains — gel particles could not be detected in the polymer solution by ultrafiltration — and of low molecular weight particles (maximum 17,000). As compared thereto the polymer prepared according to the invention (sample 1) shows a small molecular weight spread of high molecular weight particles (maximum 92,000). This uniform molecular weight distribution is responsible for the improved characteristics, (especially good spinning properties, excellent film formation and high elasticity) as compared to sample 1a.

EXAMPLE 2

109.6 parts of 4,4'-bis-(carboxyphthalimido)-diphenyl-ether (0.2 mol), 327.6 parts of 4,4'-bis-(carboxyphthalimido)-diphenylmethane (0.6 mol), 16.6 parts of isophthalic acid (0.1 mol), 4 parts of triethylamine and 3 parts of N,N'-dimethyl are homogenised at 45°C in 1800 parts of N-methylpyrrolidone and 800 parts of dimethylformamide. 25.2 parts of 4,4'-diisocyanatodiphenyl ether (0.1 mol) are then introduced. After stirring for 1 hour at 45°C, 225 parts of 4,4'-diisocyanato-diphenylmethane (0.9 mol) are added over a period of 1 hour. Subsequently the temperature is increased to 65°C. The reaction mixture becomes clear after about 4 hours. A mixture consisting of 8.64 parts of 4,4'-bis-(ethoxalylamino)-diphenyl ether (0.02 mol) and 27.2 parts of 1,3-bis-(ethoxalylamino)-benzene (0.08 mol) are added in portions over 10 minutes. Finally heating takes place for 2 hours to 200° C and this temperature is maintained until the carbon dioxide evolution subsides. After cooling 3250 parts of a highly viscous polymer solution having a solid content of about 20% are obtained. The inherence viscosity is 1.3 dl/g.

EXAMPLE 3

43.6 parts of 1,3-bis-(carboxyphthalimido)-benzene (0.1 mol), 273 parts of 4,4'-bis-(carboxyphthalimido)-diphenylmethane (0.5 mol), 16.6 parts of isophthalic acid (0.1 mol) and 1.5 parts of dibutyloxotin are heated at 50°C in a mixture comprising 1000 parts of N-methylpyrrolidone and 275 parts of hexamethylphosphoric acid triamide. Subsequently 151.2 parts of 4,4'-diisocyanatodiphenyl ether (0.6 mol) and 50 parts of 4,4'-diisocyanatodiphenylmethane are added. After stirring for 4 hours at 50°C, 5 parts of N,N'-tetramethylethylenediamine are rapidly admixed therewith. Stirring is continued for a further 2 hours at 50°C. The precondensate thus obtained is pumped over a period of 4 hours into a reaction vessel containing 400 parts of a mixture of hexamethylphosphoric acid triamide and cyclohexanone (10:1) preheated to 200°C. This mixture contains 54.8 parts of 4,4'-bis-(ethoxalylamino)-diphenyl ether. The temperature in the reaction vessel is not allowed to fall below 205°C. After all the precondensate has been pumped in, the mixture is stirred for a further hour at 205°C.

After cooling 2170 parts of an approximately 23% polymer solution are obtained. The inherence viscosity is 1.1 dl/g.

EXAMPLE 4

14.2 parts of the azomethine from 5-aminoisophthalic acid and salicylaldehyde (0.05 mol), 327.6 parts of 4,4'-bis-(carboxyphthalimido)-diphenylmethane (0.6 mol), 24.9 parts of isophthalic acid (0.15 mol) and 3 parts of diazabicyclooctane are homogenised at 60°C with 900 parts of N-methylpyrrolidone and 150 parts of cyclohexanone. 225 parts of 4,4'-diisocyanatodiphenylmethane are then added over 1 hour. The reaction mixture is stirred for 9 hours at 60°C. 34 parts of 1,4-bis-(ethoxalylamino)-benzene (0.1 mol) with stirring and the temperature rises rapidly to 165°C. There is a rapid evolution of carbon dioxide after which the mixture is cooled to room temperature.

1590 parts of an extremely viscous polymer solution are obtained. The solid content is about 35%. The inherence viscosity is 1.4 dl/g.

EXAMPLE 5

332 parts of isophthalic acid (2.0 mols) are dissolved at 50°C in 700 parts of N-methylpyrrolidone. After addition of 1.5 parts of diazabicyclooctane and 1.5 parts of 1,8-diazabicyclo (5.4.0)-undec-1-en, a mixture of 525 parts (2.1 mols) of tolylene-2,4-diisocyanate and 350 parts of ethyleneglycol monoethyl ether monoacetate is applied dropwise within 3 hours. The temperature must not exceed 53°C. Subsequently stirring is continued for 4 hours, followed by the addition of 43 parts of 4,4'-bis-(ethoxalylamino)-diphenylmethane (0.1 mol). After stirring for 1 hour at 50° to 53°C the temperature is increased to a range from 180° to 190°C. The evolution of carbon dioxide subsides and the mixture is cooled to room temperature.

1770 parts of a brown-orange, highly viscous liquid are obtained. The solid content is appr. 38%. The inherence viscosity is 1.05 dl/g.

EXAMPLE 6

166 parts of isophthalic acid, 192 parts of trimellitic anhydride and 46.4 parts of 1,6-bis-(4-carboxyphthalimido)-hexane are heated to 65°C in 1800 parts by volume of N-methylpyrrolidone and 200 parts by volume of dimethylacetamide. When the reaction mixture has become clear 5 parts by volume of N-butylamine are added. A temporary precipitation does not influence the process of the following polyaddition. 500 parts of 4,4'-diisocyanatodiphenylmethane and 19 parts of tolylenediisocyanate are then introduced and the reaction mixture is stirred for 8 hours at 65°C. Heating takes place for 2 hours to 165°C and this temperature is maintained until no further evolution of carbon dioxide occurs.

After cooling a highly viscous, clear, reddish-brown polymer solution is obtained. The inherence viscosity of the polymer is 0.93 dl/g. Yield: approximately 2700 parts.

The solid content of the polymer solution is about 27% by weight.

What we claim is:

1. A process for the preparation of modified N,N'-substituted-2,4,5-triketoimidazolidine which comprises reacting a precondensate having terminal isocyanate groups with at least one oxamidic ester to form a product having polymerizable groups wherein the precondensate is first prepared by reacting (a) a polybasic carboxylic acid, containing from 4 to 70 carbon atoms and from 2 to 6 caboxyl groups, with an excess of (b) one or more isocyanates or isocyanate forming compounds in the presence of a solvent, said oxamidic ester containing the group NH—CO—CO—OR$^V$ wherein R$^V$ represents an aliphatic hydrocarbon group containing up to 18 carbon atoms, a cycloaliphatic hydrocarbon

UNITED STATES PATENT AND TRADEMARK OFFICE
CERTIFICATE OF CORRECTION

PATENT NO. : 3,969,290
DATED : July 13, 1976
INVENTOR(S) : KURT KRAFT et al

It is certified that error appears in the above–identified patent and that said Letters Patent are hereby corrected as shown below:

Col. 9, line 21, delete "are"; line 42, correct spelling of "diisocyanates".
Col. 10, line 17, delete "possibly cases. include for"; line 27, delete "cases1" and insert --cases.--; line 35, correct the spelling of "benzophenonetetracar-"; line 65, correct the spelling of "azomethine".
Col. 11, line 3, correct the spelling of "aldehyde"; line 60, correct the spelling of "triketoimidazolidines".
Col. 12, line 1, correct the spelling of "degradation"; line 45, delete ". " after "versatility" and insert --,--.
Col. 15, line 20, after "N,N' dimethyl" insert --piperazine--.
Col. 16, line 63, delete "caboxyl" and insert --carboxyl--.

Signed and Sealed this

Thirtieth Day of November 1976

[SEAL]

Attest:

RUTH C. MASON
*Attesting Officer*

C. MARSHALL DANN
*Commissioner of Patents and Trademarks* wherein

R''' represents an at least mononuclear and at most trinuclear, mono- to tetravalent carbocyclic or heterocyclic radical containing up to 20 carbon atoms being unsubstituted or substituted by at least one substituent selected from the group consisting of halogen atoms, nitro ketoalkyl, alkylketo, dialkylamino, diarylamino, alkylarylamino, alkyl-sulfonyl, arylsulfonyl, cyano ester groups, unhalogenated and halogenated alkyl, alkoxyl, carboxylalkyl, carboxylaryl and acyl groups containing up to 20 atoms, wherein any polyfunctional aromatic groups may be linked with one another by aliphatic radicals or hetero atoms or a mono- to tetravalent cycloaliphatic hydrocarbon group containing up to 12 carbon atoms, and $R_{poly}$ represents a bi- to hexavalent aliphatic, carbocyclic or heterocyclic, at least mononuclear hydrocarbon radical containing 2 to 20 carbon atoms, being unsubstituted or substituted by at least one substituent selected from the group consisting of a halogen atom, alkyl, amino group, wherein the aliphatic radical is saturated or at least monoolefinically unsaturated, and $p$ is an integer from 2 to 6 and $R^V$ represents an aliphatic hydrocarbon group containing up to 18 carbon atoms, a cycloaliphatic hydrocarbon group containing up to 8 carbon atoms or a mononuclear aromatic hydrocarbon group being unsubstituted or substituted by at least one hydrocarbon group and having a total of up to 14 carbon atoms in the presence of a solvent, and $n$ is an integer from 1 to 80.

16. A solution of a product as claimed in claim 15 in an aprotic solvent.

17. A shaped article comprising a product as claimed in claim 15.

18. A shaped article as claimed in claim 17 which is a film, foil or fibre.

19. A shaped article as claimed in claim 17 being a foamed product with high temperature resistance.

* * * * *

UNITED STATES PATENT AND TRADEMARK OFFICE
CERTIFICATE OF CORRECTION

PATENT NO. : 3,969,290
DATED : July 13, 1976
INVENTOR(S) : KURT KRAFT et al

It is certified that error appears in the above—identified patent and that said Letters Patent are hereby corrected as shown below:

Col. 9, line 21, delete "are"; line 42, correct spelling of "diisocyanates".
Col. 10, line 17, delete "possibly cases. include for"; line 27, delete "cases1" and insert --cases.--; line 35, correct the spelling of "benzophenonetetracar-"; line 65, correct the spelling of "azomethine".
Col. 11, line 3, correct the spelling of "aldehyde"; line 60, correct the spelling of "triketoimidazolidines".
Col. 12, line 1, correct the spelling of "degradation"; line 45, delete ". " after "versatility" and insert --,--.
Col. 15, line 20, after "N,N' dimethyl" insert --piperazine--.
Col. 16, line 63, delete "caboxyl" and insert --carboxyl--.

Signed and Sealed this

Thirtieth Day of November 1976

[SEAL]

Attest:

RUTH C. MASON
*Attesting Officer*

C. MARSHALL DANN
*Commissioner of Patents and Trademarks*